Patented Apr. 16, 1940

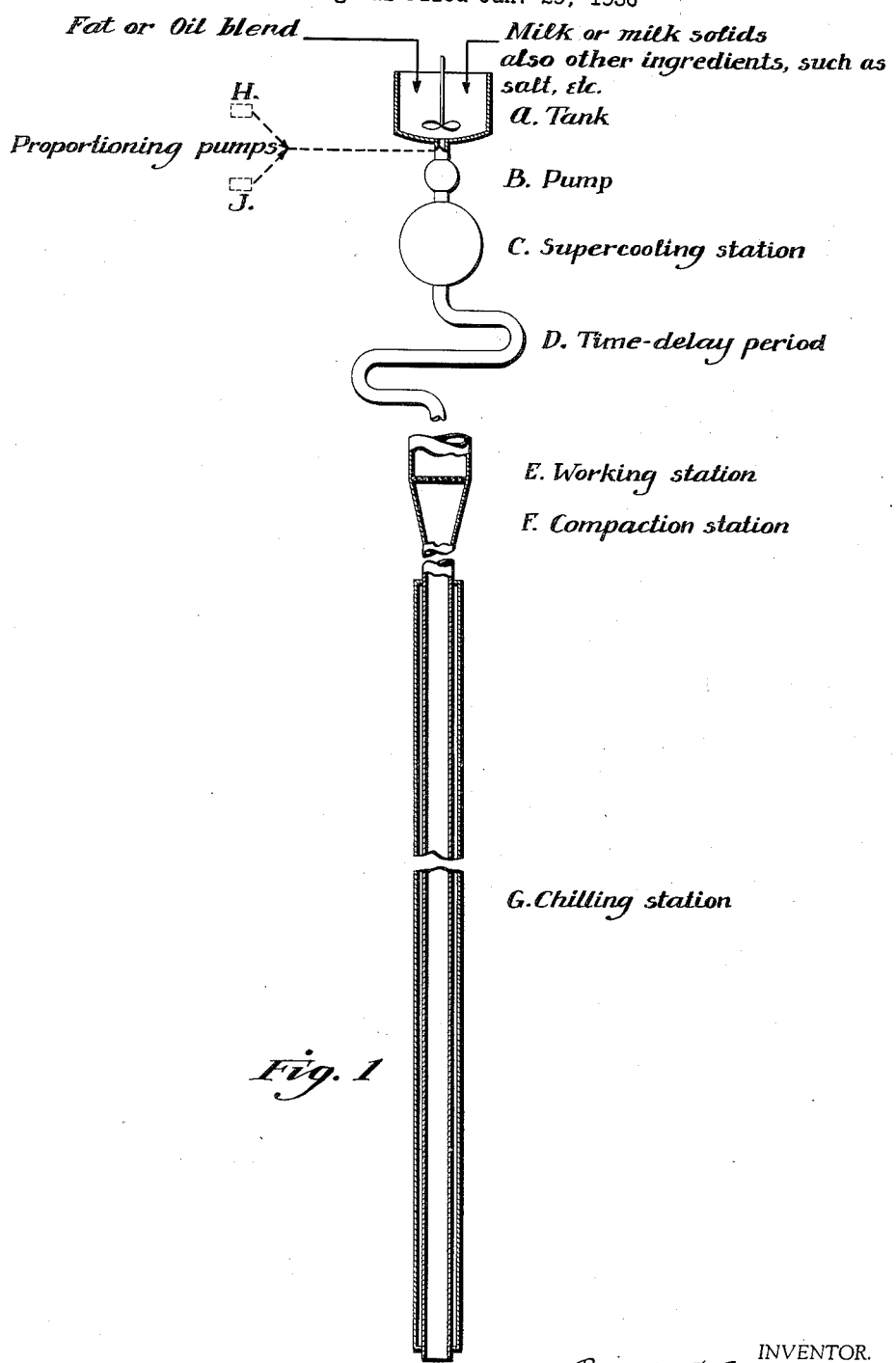

2,197,457

UNITED STATES PATENT OFFICE 2,197,457

MARGARINE AND METHOD OF MAKING

Emile E. Werk and Harry M. Zekind, Cincinnati, Ohio, assignors to The Churngold Corporation, Cincinnati, Ohio, a corporation of Delaware Continuation of application Serial No. 61,372, January 29, 1936. This application April 1, 1938, Serial No. 199,506

5 Claims. (Cl. 99—122)

This invention relates to a new method for manufacturing margarine. More particularly, the invention relates to the manufacture of margarine continuously in a closed system.

Essentially, margarine, or oleomargarine, as it is sometimes called, comprises a mixture of fats or oils churned with milk or milk solids to an emulsion of butter-like consistency. The fat component of margarine, which may comprise component or vegetable fats or oils, is the vehicle employed to approximate the butter fat of dairy butter and the milk or milk solids component is intended to impart flavor, in order that the composition as a whole will have a pleasing and palatable taste, which may or may not be adjusted to resemble the taste of actual dairy butter by the addition of other flavoring ingredients. In addition to these primary components of margarine, other ingredients such as salt, emulsifying agents, and compositions adapted to cause the margarine to act the same as butter when it is heated as in frying or cooking, may also be utilized to provide a product of the desired characteristics. For the purposes of the present disclosure the primary ingredients of oleomargarine will be referred to hereinafter as the fat component and the milk or milk solids component, while the salt, the conventional emulsifying, frothing or browning agents will be referred to as "other ingredients".

The industry of manufacturing margarine dates back a number of years, initially having received impetus because of a shortage of butter about the time of the Franco-Prussian war. Because the composition of margarine is allied closely to that of butter, and because the uses of the products are similar, most, if not all of the steps conventional in the butter making industry, have found utilization in the manufacture of margarine. With gradual recognition of the chemical problems involved in margarine manufacture, many proposals have been made to improve margarine from the chemical point of view, yet the art has persisted in relying upon artisan skill as the final control in each of the various processing stages. In view of the fact that the concepts of the present invention deviate appreciably from those of conventional practice, an analysis of the art of manufacturing margarine is requisite to appreciate the full novelty of the methods of manufacture herein disclosed and likewise to account for the unexpected nature of the advance in an art otherwise highly developed.

According to the conventional method of manufacturing margarine, the fat or oil ingredient and the milk or milk solids ingredient are placed in a churn provided with appropriate stirring and mixing gear. The object of the churning is to effect thorough mixing of the components and to destroy the tendency of the margarine components to separate from one another. The churn, in other words, is intended to homogenize the mixture to form globule dispersions analogous to the globule dispersions of milk in butter fat. The temperature during the churning period usually is held as low as possible, in accordance with the nature of the components being associated, and the churning operation is continued until a thorough emulsion is obtained.

Next, the liquid admixture or emulsion is introduced, generally by injection or spraying into a bath of water having a temperature of about 32–40° F. wherein the composition is caused to congeal to a relatively solid state. The object of the water bath chilling treatment is to congeal the emulsion as rapidly as possible, thereby to facilitate the formation of crystals of small size and also to prevent separation of the immiscible components.

Upon crystallization or congealing, the batch of margarine rises to the surface of the water in the chilling trough, or tank, and from this it is removed manually or mechanically by scoops or spoons. In certain instances, the margarine next is placed in a second water bath of slightly warmer temperature, the function of which is to soften the crystals to such an extent that they may subsequently be worked by kneading.

The use of chilled water to effect crystallization and prevent the separation of the emulsion components has several serious disadvantages. The batch of churned emulsion passed into contact with the water soon loses a certain portion of the milk or milk solids ingredient, which is dissolved by the water from the admixture originally established. Consequently the chemical composition of the margarine is changed an indeterminate and uncontrollable extent, which varies with each batch being processed. During this period, of course, a certain quota of water over and above that intended is picked up and retained by the margarine, but the amount of the quota, unfortunately, is not uniform for each successive batch.

On the other hand, moreover, unless the water is totally free from odors or taste producing substances, the flavor of the margarine is affected; consequently it is necessary to maintain rigid control of the freshness of the water used in the chilling bath and its purity from the point of view of taste. This control, in turn, necessitates continuous or frequent change of the water in the trough, hence considerable expense is encountered in the chilling of relatively large volumes of water to a relatively low degree of temperature.

To obviate the difficulties attending the use of chill water, another method is used whereby the emulsion is passed in film form over chill rolls to effect a hardening of the admixture before separation of the emulsion has had opportunity to take place. This procedure, however, changes the danger of contamination by changing only the source from which the contamination can be introduced into the margarine. Odors in the air are just as apt to spoil the intended flavor as odors or tastes in water, even though excess air is easier to eliminate than excess water. Moreover, in the air congealing method it is dangerously easy to contaminate the margarine with germs with such equipment on account of harmful mold spores present in the atmosphere. Besides the danger of incorporation of undesirable taste from the air, the air itself has a pronounced oxidizing action, and hence the intended taste may be altered appreciably through ordinary chemical change, particularly of the fat component.

After the emulsion has been congealed and warmed sufficiently to render it appropriately plastic for further handling, the batch of margarine is placed on tables or trucks where excess water is allowed to drain. Next, it is kneaded.

In the kneading operation the solidified but plastic composition is thoroughly intermixed; the crystals of margarine are squeezed together until a homogeneous mass results. In practice, the kneading operation essentially reestablishes the homogeneity of the margarine, compacts the crystals and squeezes out the excess of water. Finally, the batch of margarine is salted to taste, other ingredients such as the conventional hydrophile-lipophile emulsifying assistants and antispattering or frothing agents are incorporated, and the composition, after refrigeration, is ready for packaging and distribution.

It is extremely difficult, in the open batch system of manufacturing margarine to maintain the high degree of cleanliness desirable. Each of the machines, which must be large enough to handle separate batches of relatively large volume, must be cleaned manually at the end of each run. Because of all of the crevices and irregular surfaces of machines, complete cleaning entails an appreciable amount of effort. Moreover, a substantial amount of material is lost or wasted through processing in the open batch system. All of the margarine subjected to crystallization in the chill water stage is not recovered by the scoops or shovels, but some remains in the water and is lost unless the water is mechanically filtered. Also, after batches are run through the various machines, appreciable quotas remain on the surfaces after the last batch is scraped out with the scoops or shovels. This amount is lost in cleaning.

The objective of the margarine manufacturer is to make a product which, from the point of view of taste, is as pleasing and as palatable as fresh butter. In spite of the fact that only the purest of materials are used in the conventional manufacturing process, it is extremely difficult to obtain products which are consistently uniform as to taste and as to composition. The possibilities of contamination and the possibilities for variation appear so frequently, and at so many phases of the process, that it is extremely difficult to satisfy the modern trade requirements of a food product which is the same in consistency, taste, quality and appearance daily or weekly as retail supplies are replaced.

The primary objective of the present invention has been to provide a process for manufacturing oleomargarine which insures uniformity in chemical composition and uniformity in taste or palatability. The invention contemplates a process for manufacturing margarine which precludes possibility of contamination of the margarine from extraneous sources such as the air or from water.

Broadly stated, the present invention is predicated upon the concept of manufacturing oleomargarine continuously in a closed system, the constituting components entering into this system at one end, the oleomargarine being discharged from the system completely finished at the final stage. The system preferably is closed completely; no contamination other than that initially present in the constituting components can find its way into the product being manufactured to alter or detract from the natural and intended taste thereof. By virtue of the control exercised in the process as hereafter described, the final product acquires a consistency and physical structure which is very desirable but which has not been possible to provide in the past.

The manufacture also is conducted in such a manner that the ingredients intended to be present are not lost in whole or in part during the manufacturing stage.

Briefly, we have discovered that it is possible to manufacture margarine of an improved and highly uniform composition, particularly as to consistency and also as to taste, economically and continuously in a closed duct system. Broadly stated, the process of the invention may be said to comprise, first, establishing an admixture of the constituting components of oleomargarine, then passing successive impressed increments of this admixture through a supercooling zone, where the material is cooled below the congealing point thereof but not allowed to congeal, preferably while it is being agitated, next passing the supercooled liquid through a time delay zone where setting of the supercooled liquid is permitted to take place, then passing the congealed or set admixture to a working station where large, lumpy formations, if any (e. g., during setting), are distintegrated, next subjecting the worked margarine to compaction, at which station the worked crystals or margarine are repacked, and finally cooling this material slowly and gradually over a period of time. After this final stage the margarine is compacted and is ready for packing.

While some of the individual steps of the process described above have been proposed in the past, the present invention is predicated upon the discovery that margarine, having improved and superior qualities, is obtainable by the combination of steps of the process hereafter described. In particular, we have discovered that the last stage of the process, the step of cooling the margarine slowly and gradually over a period of time, is equally as important in so far as improvement of results is concerned if not even more so than the prior steps of supercooling which have attracted most of the attention in the past.

It has been our determination, through an extensive series of investigations, that if the last stage of the process be not utilized then the margarine is not suitable for sale, regardless of the exactitude of the controls utilized in the preceding phases of the manufacture. The improvements in quality and, notably, in the consistency of margarine, which are imparted to it during the period in which it is cooled slowly and gradually render the product superior to any of the products made by the prior processes.

To assist the skilled in the art in understanding the continuous closed system method of manufacturing margarine according to the present invention, the steps of the process are disclosed, first, in respect to their function and next in respect to the apparatuses controlled to perform the functions of the respective stations. To these ends it will be understood that the present invention may be practiced with a variety of forms of apparatus.

In Figure 1 of the drawing, a tank or mixing vessel equipped with an appropriate stirring means is illustrated at A. The constituting components of the oleomargarine intended to be manufactured are introduced into the tank A, separately, or in mixed relation pending continuous withdrawal therefrom during the operative period of manufacture. It may be mentioned that the fat or oil ingredient of oleomargarine manufactured according to the present process may comprise vegetable oil such as cotton seed oil, palm oil, palm kernel oil, coconut oil, soy bean oil and the like or may comprise animal fat such as oleostearin, oleo oil, or neutral lard. Generally speaking, the milk, salt and other ingredients are admixed with about 80% or more of oil component. The blending of oils, fats, milk, and milk solids in the proper proportions is well understood in the art. The fat and milk components are mixed thoroughly before they are introduced into the tank A to insure complete homogenization in the final product. The temperature of the ingredients in the tank A preferably is maintained just above the setting or congealing point thereof, that is to say, the admixture in the tank is maintained at a temperature just high enough to keep the admixture in liquid condition pending its withdrawal from the tank.

The other ingredients such as salt, flavoring agents, emulsifying agents and anti-spattering agents also are introduced into the tank A at the time that the admixture originally is established. It will be seen therefore that all of the components of the margarine intended to be present in the final product are assimilated together at the start of the process of the present invention.

In place of establishing an admixture of components in vessel A, an admixture may be established continuously during the operative period by means of one or more proportioning pumps H and J indicated by the dotted lines in the diagram. The proportioning pumps are adjusted to proportion the oil component and the milk component, together with the other ingredients, in the relation desired. The materials fed from the proportioning pumps preferably are passed through a mixing valve (not shown) where emulsification is totally or partially completed before the liquid is passed to the subsequent processing stations.

After the margarine components are associated at the proportioning pumps, H and J, or in the vessel A, the liquid next is passed to a pressure pump B, then to a supercooling station C. The pressure to which the pump B is capable of subjecting the margarine admixture in the system may vary in accordance with the nature of the composition being processed, and in accordance with capacity or dimensional characteristics of the apparatus of which the system itself is comprised; a pressure of from about 10 to 500 pounds or more per square inch is suitable. In the supercooling station the liquid, the temperature of which is just above the congealing point at entrance, is cooled below the congealing point, but not allowed to congeal. Supercooling is conducted preferably while the liquid is being agitated. At this station final liquid phase homogenization of the components takes place. It is recommended that the liquid passing through the supercooling station be supercooled as low as possible below the setting point of the liquid consistent with continuity of operations.

Successive increments of supercooled margarine admixture next are passed directly, under pressure, to a zone where a period of time is permitted to lapse before the increments are subjected to further processing. At this station a time interval, sufficient to allow the supercooled liquid to set or congeal, is permitted to pass before the margarine is subjected to further operations. The admixture entering the time interval station D is a quasi-liquid.

One function of the time delay station is to permit the supercooled liquid to congeal as rapidly as possible to preclude any possibility of separation of the emulsion components. Another function of the time delay station is to provide an interval of time sufficient to enable crystal growth to take place. The heat liberated during crystallization of the admixture is liberated at this point. The changing of state of the margarine during the time delay period preferably is permitted to take place while successive increments of margarine are moving through the zone of delay of the duct. The composition discharging from the time delivery stage is of plastic, somewhat slushy consistency, depending upon the temperature and upon the interval of time elapsed during passage therethrough. However, care need be taken because if the material becomes too hard, it adheres to the walls of the duct and plugs the flow.

From the time delay station D the plastic admixture is passed through an appropriate duct connection to a working station provided with a disintegrator E, where large crystal or lumpy formations, previously formed during the congealing period, are disintegrated. This working reestablishes a thorough admixture of the components and re-incorporates any ingredients which may have separated therefrom during the time that the margarine was in liquid condition, or during the time that the same was being permitted to congeal in the time delay phase of the process. The term "lumpy," as it is used in the present specification, in intended to mean non margarine-like formations which detract from the uniformity of the margarine and its desired consistency.

From the working station the margarine, under substantially uniform pressure, is next passed to the compaction station F, where any voids or openings formed during the working phase of the process are eliminated from the mass. The primary function of the compaction station is to confine and squeeze the margarine to increase its density.

At this stage of the manufacture the material has been formed into a plastic mass, the large lumps and crystals initially formed in the time delay station have been disintegrated, and the voids, openings and air pockets have been worked out. However, we have discovered that at this time the material still is undergoing a peculiar physical change of state. If the material is cooled quickly to a low temperature lumps are reformed, and the useful results of the disintegrating operation are undone. If such lumps are present in the margarine it is not unfit for use, but is unfit for sale because the housewives refuse to purchase it. The housewives usually desire to add coloring to the margarine, and when this is done, it is impossible to obtain distribution of the coloring matter evenly throughout the margarine mass if lumps are present, without kneading and working the coloring matter into the margarine for prolonged periods of time. For obvious reasons, it is requisite that margarine be colored quickly and conveniently by the housewives. The problem of obviating this incipient crystallization is a difficult and complex one.

In the development of the present process we have discovered that a notable improvement in the texture is obtained, and the formation of lumps through incipient crystallization is avoided if the margarine which issues from the compaction station next is cooled, gradually and slowly, over a period of time, until the consistency of the material is uniform throughout its mass. In other words, we have discovered that the rate of cooling of the margarine, which is in the plastic, partially finished state, is quite as important if not much more so than the degree of chilling. At this stage, paradoxically as it may seem, if the chilling is slow and gradual, tiny, rather than large, crystals or lumps are caused to grow, and the texture is smooth and uniform. However, if the chilling is rapid then crystallisis is augmented and lumps are formed. Essentially, this control of the rate of cooling of the margarine, after it has passed the compaction station, effects homogenization of the margarine mass in a thermal way, just as the disintegrator effects homogenization of the mass in the mechanical way, and for this reason this final phase of the process of the invention may be referred to as "thermal homogenization" of the margarine. Peculiarly, the phenomenon is very much like that which occurs when hot steel is plunged into cold water. A tempering step is next essential to impart the desired final properties to the mass.

In the preferred practice of the invention the margarine, after leaving the compaction station, is passed through a refrigerated duct or chamber controlled as to temperature, so that the margarine passing therethrough is cooled slowly and gradually. The length of the chamber is such that the time required for the margarine to pass therethrough will permit it to reach a uniform mass by the time it reaches the discharge terminal. By virtue of the fact that various margarine mixtures respond differently to different temperature conditions, it is relatively impossible to define with preciseness the range of temperature to be used and, in addition, the range utilized is not sharply delineated for any particular material. However, to illustrate, the slow and gradual cooling control is exemplified by the cooling of a mass of margarine about 12-15 inches wide and about a half inch thick from a temperature of about 70° F. to a temperature of 55° F. over a period of about 15 minutes, the chilling chamber being refrigerated to a temperature of only 40° F. to prevent abruptness of temperature change. In general, the slower the rate of cooling the better the results will be.

If desirous, the discharge terminal of the chilling station may be configured to print cross section, so that the margarine issuing therefrom continuously is formed into a size slug which may be cut into lengths for packing.

In Figure 1 of the drawing, the cross-sectional view through the apparatus relating to the working station E and the compaction station F is enlarged for purposes of illustration. The portion of the duct corresponding to the entrance to the working station E may be of about the same size in cross-section as the size of the duct at the time delay zone.

From the point of view of apparatus, the supercooling station C may comprise a machine of the type conventionally used to manufacture ice cream continuously; that is to say, a machine having a chamber or a plurality of chambers surrounded by refrigerating medium, with an agitating element rotating in the chamber or in the chambers respectively. When this type of machine is used, it is recommended that the agitating element be arranged in the chamber for scraping of the chamber walls to free the same from any solid substances there congealed. In place of apparatus of this type, the supercooling station may comprise a conventional homogenizer equipped to effect refrigeration and supercooling of the liquid passing therethrough at the time that the same is being homogenized. If it is desired to use a reciprocating pump instead of a rotary pump to propel the margarine through the various processing stations of the duct the supercooling station may comprise a sleeve way appropriately provided with a refrigerating medium, in which instance the plunger of the pump may constitute the sleeve for reciprocating travel in the reciprocating sleeve way. In such an instance the margarine admixture flows into the sleeve way during backward stroke of the pump, is supercooled in the sleeve way and is propelled into the duct for further processing during forward movement of the sleeve plunger of the pump.

The time delay station, as disclosed in the drawing, comprises a section or a series of sections of pipe preferably bent, as shown, to reduce the amount of space required. The interval of time delay provided by the station is arranged to suit the given characteristics of the admixture intended to course therethrough, either by adjustment of the total length of the section or sections of pipe utilized or by control of the flow of the margarine through the station. With a given type of margarine, the actual time delay control required is best determined experimentally during a trial run, after which no further substantial changes are required unless a margarine of a different type or quality is to be processed.

The working station E comprises a screen or foraminous disc interposed transversely to the direction of flow and possessing the capacity to disintegrate uniformly any lumps or crystal formation in the margarine, impressed against the screen under pressure. The margarine admixture passing through the working station is discharged therefrom in spaghetti-like form and the margarine spaghetti formations are compacted together at the compaction station. In place of the screen disclosed, the working station E may comprise a pair of coacting gears or screws, driven mechanically to crush lumps contained in the margarine passing through.

The compaction station preferably comprises a vessel having a constricted discharge orifice whereby the margarine contained in the vessel is subjected to a squeezing pressure substantially uniform throughout the mass. Large crystal formations are broken down to a fine state of subdivision at the working station and these fine particles, when reassimilated into a continuous mass, subjected to the thermal homogenization, provide a margarine of a consistency which is highly uniform, even and smooth.

The chilling station D, as previously disclosed, preferably comprises a refrigerated duct or chamber. The chamber is dimensioned so that the margarine passing therethrough will be cooled slowly and uniformly. It is not requisite that the margarine be subjected to pressure in the chamber, except at the discharge portion in the event that the margarine is to be formed into print cross section.

The compaction station F and the chilling station C may be combined into one zone of the duct if desired by the utilization of a propulsion screw installed in a refrigerated zone of the duct in which instance successive increments of margarine are fed from the working station to the screw which propels the increments through the refrigerated zone and at the same time prevents any channeling or adhesion of the margarine to the walls of the duct.

Mechanically speaking, each of the pieces of equipment corresponding to the respective stations preferably is connected to the adjacent one so as to comprise a closed or a pressure tight duct or passageway through which successive increments of the margarine admixture pass for processing. In passing through the respective stations of the duct the margarine is not exposed to the altering action of undesirable substances. In such a closed process nothing is introduced except those components intended to be present in the final composition and nothing, moreover, has opportunity to escape the admixture during successive stages in the process.

The closed system is cleansed easily and quickly by simply flushing the system with hot water or suitable detergent solutions. From the point of view of space required, it may be mentioned that the apparatus of the type herein disclosed occupies about one-fifth to one-tenth the space required by the customary equipment, while, from the point of view of results, a product which is superior to those that have been available is obtained.

This application is a continuation of my application Serial No. 61,372, filed January 29, 1936.

Having described our invention, we claim:

1. A method of manufacturing margarine which comprises, establishing an admixture of the constituting components of margarine, passing the admixture through a supercooling station and agitating the admixture during its passage therethrough, next passing the admixture under pressure to a time delay station where the supercooled admixture is permitted to congeal, then passing the material through the working station where lump formations are disintegrated, then compacting the material to remove the voids and openings, and then cooling the material slowly and gradually over a period of time, to obtain a product of stiff consistency, free of lump formations.

2. The method of making margarine which comprises, establishing an admixture of the constituting components of margarine, chilling the admixture to a supercool quasi-liquid state, then permitting the supercooled admixture to congeal at a time delay station, subsequently working the congealed mass to remove the lumps therefrom, then compacting the worked mass to remove the voids and openings and finally, further cooling the mass slowly and gradually, over a period of time, to provide a margarine of stiff, uniform consistency, free of lumpy formations.

3. The method of manufacturing margarine which comprises, continuously forming an admixture of the constituting components of margarine in liquid condition, then passing successive increments of this admixture through a supercooling zone wherein the material is supercooled to a temperature below the congealing point thereof, but not allowed to congeal, then passing the successive increments to a time delay station and permitting the material therein to congeal, then working the successive increments to destroy the lumps therein, next compacting the material to remove the voids and openings and finally, further cooling the material slowly and gradually, over a period of time, to obtain margarine which is of wrappable consistency and free of lumpy formations.

4. In the art of manufacturing margarine, the step of chilling an admixture of the constituting components of margarine which has been supercooled, congealed, and worked to lower the temperature thereof, slowly and gradually, over a period of time, to obtain a margarine which is free of lumpy formations.

5. The process of making margarine which consists in forming a liquid emulsion of the constituting components of margarine, supercooling the emulsion to a temperature below the point at which it congeals, then permitting the emulsion to congeal, next disintegrating the lumps formed during the congealing state and compacting the material to remove the voids and openings therein and then further cooling the material slowly and gradually over a period of time until it is of stiff, uniform, plastic consistency and free of lumps.

EMILE E. WERK.
HARRY M. ZEKIND.